US007325321B2

(12) United States Patent
Künzi et al.

(10) Patent No.: US 7,325,321 B2
(45) Date of Patent: Feb. 5, 2008

(54) METHOD AND DEVICE FOR MONITORING THE ALIGNMENT OF A MEASURING INSTRUMENT, AND MEASURING INSTRUMENT

(75) Inventors: Hansruedi Künzi, Greifensee (CH); Roger Leisinger, Zürich (CH)

(73) Assignee: Mettler-Toledo AG, Greifensee (CH)

( * ) Notice: Subject to any disclaimer, the term of this patent is extended or adjusted under 35 U.S.C. 154(b) by 174 days.

(21) Appl. No.: 11/008,073

(22) Filed: Dec. 9, 2004

(65) Prior Publication Data
US 2005/0126024 A1    Jun. 16, 2005

(30) Foreign Application Priority Data
Dec. 11, 2003    (EP)    ................................. 03104652

(51) Int. Cl.
*G01C 9/06*    (2006.01)
(52) U.S. Cl. .............................. 33/366.16; 33/366.14; 33/366.12
(58) Field of Classification Search ............. 33/366.14, 33/366.15, 366.16, 366.23, 366.11–366.13, 33/366.17–366.27; 356/249, 143, 148; 250/338.1–360.1, 221
See application file for complete search history.

(56) References Cited

U.S. PATENT DOCUMENTS

| | | | | | |
|---|---|---|---|---|---|
| 3,271,650 | A | * | 9/1966 | Riddle | ........................ 318/648 |
| 3,863,067 | A | * | 1/1975 | Gooley | .................... 33/366.16 |
| 4,154,000 | A | * | 5/1979 | Kramer | .................... 33/366.14 |
| 4,182,046 | A | * | 1/1980 | Ludlow et al. | .......... 33/366.16 |
| 4,494,620 | A | | 1/1985 | Knothe et al. | |
| 4,590,680 | A | * | 5/1986 | Hanchett et al. | ......... 33/366.16 |
| 4,755,801 | A | * | 7/1988 | Gooley | ........................ 340/566 |
| 5,031,329 | A | * | 7/1991 | Smallidge | ................ 33/366.12 |
| 5,101,570 | A | * | 4/1992 | Shimura | .................. 33/366.16 |
| 5,111,039 | A | * | 5/1992 | Froning | ................... 250/231.1 |
| 5,313,713 | A | * | 5/1994 | Heger et al. | ............. 33/366.14 |
| 5,794,355 | A | * | 8/1998 | Nickum | .................. 33/366.16 |

(Continued)

FOREIGN PATENT DOCUMENTS

DE    3800155 A1 *    7/1989

(Continued)

Primary Examiner—G. Bradley Bennett
Assistant Examiner—Tania C Courson
(74) Attorney, Agent, or Firm—Standley Law Group LLP

(57) ABSTRACT

The method and the device serve to monitor the alignment of a measuring instrument, specifically a balance. To perform this function, the monitoring device is equipped with an inclination sensor based on the principle of a spirit level, with a container filled with a fluid in which a bubble is formed. According to the invention, the position of the bubble is measured optically by means of a radiating element that is arranged on one side of the bubble and serves to emit a radiation, and a sensor element that is arranged on the opposite side of the bubble and serves to receive the radiation. The radiating element, preferably a light-emitting diode, and the sensor element, preferably a photodiode, together define the sensor axis (sx) on which the bubble is centered as long as the sensor axis runs parallel to the axis of the gravity force. Furthermore, the sensor element is flanked by at least two reference elements that are likewise receiving the radiation. The reference elements serve to test whether the intensity of the radiation is within a permissible range. A function test is performed automatically inside the monitoring device in order to verify that the monitoring device is functioning correctly.

26 Claims, 8 Drawing Sheets

U.S. PATENT DOCUMENTS

| | | | |
|---|---|---|---|
| 6,137,065 A * | 10/2000 | Zefira | 177/25.13 |
| 6,392,223 B1 | 5/2002 | Hjertman et al. | |
| 6,647,634 B2 * | 11/2003 | Yang et al. | 33/390 |
| 6,848,188 B2 * | 2/2005 | Tacklind et al. | 33/290 |
| 2002/0162235 A1 * | 11/2002 | Rando | 33/366.16 |

FOREIGN PATENT DOCUMENTS

| | | |
|---|---|---|
| DE | 4316046 | 7/1994 |
| DE | 4320494 | 10/1994 |
| DE | 19931679 | 1/2001 |
| GB | 2234812 | 2/1991 |
| JP | 58033114 | 2/1983 |
| JP | 61108927 A * | 5/1986 |

* cited by examiner

METHOD AND DEVICE FOR MONITORING THE ALIGNMENT OF A MEASURING INSTRUMENT, AND MEASURING INSTRUMENT

BACKGROUND

The present invention relates to a method and a device for monitoring the alignment of a measuring instrument, wherein the monitoring device is equipped with an inclination sensor. The invention further relates to a measuring instrument, specifically a balance, which is equipped with the monitoring device.

Measuring instruments, in particular gravimetric measuring instruments such as for example thermo-gravimetric instruments, gravimetric moisture-determination instruments, or balances, have to meet special requirements in regard to how they are set up at the place where they are used. This applies in particular to balances equipped with a weighing cell and a load receiver which are used for the gravimetric measurement of weights. Ideally, a balance is set up in a position where the measurement axis of the balance—i.e., the axis that should coincide with the line of action of the weight force of a weighing object to be measured—runs in the direction of the gravity field. This ideal position can also be called the reference position of the balance. If the measurement axis of the balance, which is normally perpendicular to the plane of the weighing pan, is inclined at an angle relative to the gravity field, the weighing result will have a value that reflects the actual weight of the object multiplied by the cosine of the angle of inclination.

This is the reason why balances that conform to the requirements for official certification are often equipped with an inclination sensor and with a leveling device that allows the balance to be set to the reference position which is indicated by the inclination sensor. The sensor signals of an electrical inclination sensor, which are for example delivered to a display unit, indicate by how much the sensor axis which is normally aligned with the measurement axis of the balance deviates from the direction of the gravity field. The leveling device, which includes for example two axially adjustable feet of the balance, allows a deviation of the sensor axis and thus of the measurement axis from the gravity axis to be corrected.

A balance with an electrical inclination sensor is disclosed in DE 32 34 372 A1 [1], where the sensor signals are not used to correct the position of the balance, but to digitally correct the inclination-dependent error of the balance. According to [1], the inclination sensor can have either a pendulum mass or a partially filled liquid container with a gas bubble, where the position of the movable element is detected by optical or inductive means.

An electrical inclination sensor consisting of a sprit level with a container holding a partial filling of an electrically conductive liquid with a gas bubble is disclosed in JP 61 108 927 A2 [2]. According to [2], this inclination sensor is used in a balance and triggers an acoustical alarm when the out-of-level condition reaches a limit value.

The principal construction of a spirit level is described in detail in DE 38 00 155 A1 [3]. With the concept proposed in [3] the angle of inclination can be read directly from the spirit level.

An arrangement is disclosed in JP 58033114 with a spirit level that has a light-emitting element on one side and a plurality of optical sensors on the other side. A light-transmitting colored liquid is enclosed in a hemispherical container in such a way that a bubble is formed. The container itself is enclosed in a cube-shaped transparent housing. The optical sensors are arranged on the outside of the cube-shaped housing. The light rays from the light-emitting element pass through the liquid and the bubble and fall on the optical sensors. If the spirit level is put in an inclined position, the bubble moves out of place and the signals of the optical sensors change. Both the angle and the direction of the inclination are detected with this device.

An optoelectronic inclination measuring system with a deformable pendulum configured as a dual parallel spring linkage that cooperates with an emitter and a receiver unit is described in DE 43 16 046 C1. In addition to a sensor diode, there can be reference diodes arranged on the receiver side to detect and compensate the effects of undesirable extraneous factors such as changes in temperature and voltage.

An inclinometer of very high sensitivity which works in two dimensions is described in DE 199 31 679 A1. It has a spirit level with a light source arranged at the underside. An optoelectronic sensor, preferably of a type that is based on CCD (charge-coupled device) technology, extends across the top of the spirit level.

If the balance is not provided with an automatic inclination-monitoring arrangement, it is a requirement in weighing procedures that are relevant to product quality to inspect the spirit level and verify the leveled position of the balance before the weighing process is started. However, this rule is not always adhered to in practice. With automatic monitoring, on the other hand, there can be failures in the monitoring device. It is possible on the one hand that an alarm is triggered although the angle of inclination has not passed its prescribed limit, and on the other hand it can occur that the limit is exceeded even for a long period of operation without triggering an alarm. Both kinds of errors can have serious consequences. With the first kind of error, the false alarms which are also referred to as "false positives" can cause an unnecessary interruption of the measurement or production process. With the second kind of errors, also referred to as "false negatives", the measurements and/or production processes continue in spite of the fact that the prescribed tolerance limits have been exceeded.

SUMMARY

The present invention therefore has the objective to provide an improved method and an improved inclination-sensing device for monitoring the condition of a measuring instrument, specifically of a balance, and to provide a measuring instrument, specifically a balance, that is equipped with the monitoring device.

In particular, the objective of the present invention calls for a method and a monitoring device that ensure a precise detection when at least one limit value for the inclination angle is exceeded and substantially avoid the problem of false messages or false alarms.

In addition, the monitoring device should have a simple configuration and a cost-effective design and it should be simple to use in a balance or in other measuring devices. Furthermore, the monitoring performance should not be negatively affected by changes in the properties of components such as electrical and optical elements nor by extraneous factors such as stray light.

The measuring instrument according to the invention should therefore receive an optimal monitoring surveillance in regard to an out-of-level position.

A solution that satisfies the foregoing objectives is provided through a method, a monitoring device, and a measuring instrument with the features specified, respectively, in the appended independent claims. Advantageous further developed embodiments of the invention are defined in additional claims.

The method and the device serve to monitor the alignment of a measuring instrument, specifically a balance. To perform this function, the monitoring device has an inclination sensor based on the principle of a spirit level, i.e., with a container that is partially filled with a liquid so that a bubble is formed.

The position of the bubble is measurable optically by means of a radiation-emitting element on one side of the bubble and a radiation-sensing element on the opposite side of the bubble. The emitter element, preferably a light-emitting diode, and the sensor element, preferably a photodiode, define a sensor axis that passes through the center of the bubble if the sensor axis if parallel to the direction of the gravity field.

Furthermore, at least two radiation-sensing reference elements are arranged laterally flanking the sensor element to verify that the radiation intensity is within a permissible range. To check the monitoring device, a function test is performed automatically within the monitoring device.

Thus, it is possible to detect and correct changes in the intensity of the radiation emitted by the emitter element and/or received by the reference elements, for example due to a change in the power supplied to the emitter element or due to a color change of the elements in the light path. If the light intensity from the emitter element is, e.g., too low, the foregoing arrangement prevents the problem that the bubble is erroneously assumed to be lying in the sensor axis and to be attenuating the light from the emitter element while the bubble is in fact in a position outside the sensor axis. In other words, a situation is prevented where the inclination is erroneously registered as being within the tolerance range. Conversely, if the light intensity from the emitter element is too high, the inventive arrangement also prevents the problem that the bubble is erroneously assumed to be lying outside the sensor axis where it would not attenuate the light from the emitter element while the bubble is in fact centered on the sensor axis. Thus, the inventive arrangement also prevents a situation where the inclination is erroneously registered as being outside of the tolerance range.

The inclination sensor which is of an uncomplicated design as described above can thus register when the intensity of the radiation from the emitter is too high or too low, and this can be corrected by the simple measures which will now be described.

The electronically monitored inclination sensor or spirit level can be arranged in an enclosed space inside the housing of the measuring instrument. With this arrangement, the inclination sensor is isolated from the outside light. However, the position of the bubble can no longer be verified by visual inspection.

In a preferred embodiment, the inclination sensor or spirit level is arranged on the housing in such a way that the position of the bubble can be visually verified, so that the electronic monitoring is supplemented with the possibility of a visual verification by the user. Because the radiating element is of a small size, it does not stand in the way of the visual inspection of the bubble. A possible interference from outside light with the electronic monitoring of the bubble is preferably prevented by selecting radiating, sensing, and reference elements working in a range of wavelengths such as for example the infrared range which lies substantially outside of the range of the interfering outside light.

Extraneous influences on the measurement can be further suppressed by emitting the radiation in the form of periodic or aperiodic pulses, preferably in intervals of 5 to 15 milliseconds and with a pulse width of 5 to 15 microseconds. For example, the pulses could follow each other at constant or slightly fluctuating period intervals of 10 milliseconds and have a pulse width of 5 microseconds. The desired radiation intensity is set by changing the height of the pulses. Interfering signals of a periodic nature can further be suppressed by using a fluctuating period length.

The reference elements are arranged preferably along a straight line that also runs through the sensor element, so that the reference elements are not receiving rays that have passed through the bubble if the latter is centered on the sensor axis. The sensor element therefore delivers a sensor signal corresponding to a radiation intensity that is attenuated by the bubble, while the reference elements deliver sensor signals corresponding to a radiation intensity that is not attenuated by the bubble. The radiation intensity indicated by the reference elements can therefore be used as a reference for correcting the radiation intensity. With a more complex electronic circuit, the signal of the sensor element could also be normalized, i.e., measured as a ratio of a signal produced by the reference elements which represents the non-attenuated radiation level, so that the result would be a signal that is independent of the intensity of the radiation produced by the radiation-emitting element.

Most advantageously, however, the signals emitted by the sensor element and the reference elements are evaluated by means of comparators. According to this concept, the output signal of the sensor element is compared to a first threshold value corresponding to the distance of the bubble from the sensor axis which delimits the permissible range of inclination. The output signals of the two reference elements are compared by means of a window comparator to a lower, second threshold value and an upper, third threshold value, where the latter two threshold values define the permissible range of the radiation intensity and thus the range of electrical power to be supplied to the radiation-emitting element.

The output signals of all comparators are periodically interrogated and evaluated in a processor, wherein preferably each time a first threshold value which indicates an out-of-level condition is not attained or is exceeded, an inclination counter is changed, respectively, towards a first or second limit value, and/or each time a second threshold value which discriminates between a sufficient and an insufficient intensity of the radiation is not attained, an intensity counter is changed in the direction from a third towards a fourth limit value, and/or each time the third threshold value which indicates an excessive intensity of the radiation is exceeded, the intensity counter is changed in the direction from the fourth towards the third limit value, and/or after an error has been registered during a test sequence, a function counter is changed in the direction towards a fifth limit value, and/or after an error has been registered during the inclination measurement, the function counter is changed in the direction towards the fifth limit value, or an error counter is changed in the direction towards a sixth limit value.

With the use of the inclination counter, the intensity counter, the function counter and the error counter, it is possible to suppress momentary irregularities that may in some cases occur only once, so that unnecessary error messages are avoided.

When the first or second limit value is reached, a signal is given that the inclination is within or outside of the tolerance range, and a measurement or production process may be stopped if necessary.

When the third or fourth limit value is reached, the intensity of the radiation or, more specifically, the electric power supplied to the radiation-emitting element is changed as needed to bring the radiation intensity back into a permissible range.

When the fifth or sixth limit value is reached, a signal is triggered to indicate the error condition, and if a measurement or production process is underway, it may be stopped if necessary.

Of course, it is also possible to process the error messages without filtering them.

All of the filter functions described above can be realized inexpensively by means of a software program. All of the limit values are preferably stored in an electronic memory and selectively changeable. The threshold values are preferably adjustable selectively by means of resistors that can be controlled by the processor, for example transistors. Likewise, the operating voltage that is applied to the radiation-emitting element in the form of pulses is preferably controllable by way of the processor.

BRIEF DESCRIPTION

A more detailed description of the invention is presented below with reference to the drawings, wherein:

FIG. 1 represents a balance 1000 in accordance with the invention, with an inclination sensor 1 that is integrated in the balance housing in such a way that it is visible to the user;

FIG. 2 represents an inclination sensor 1' whose sensor axis sx is aligned with the axis gx of the gravity force and which consists of a spirit level with a cylindrical container 10 that is closed off at both ends by transparent plates and filled with a liquid 11 leaving a bubble 12, with a radiation-emitting element D1 arranged above and a sensor element D2 arranged below the inclination sensor;

Figure 10:
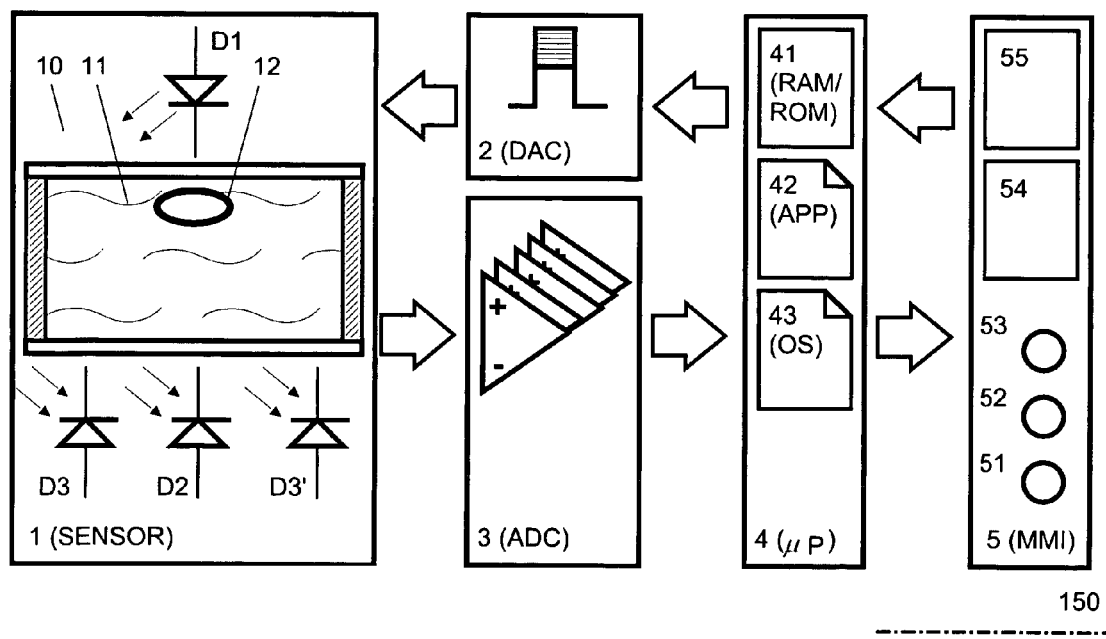
Figure 11:
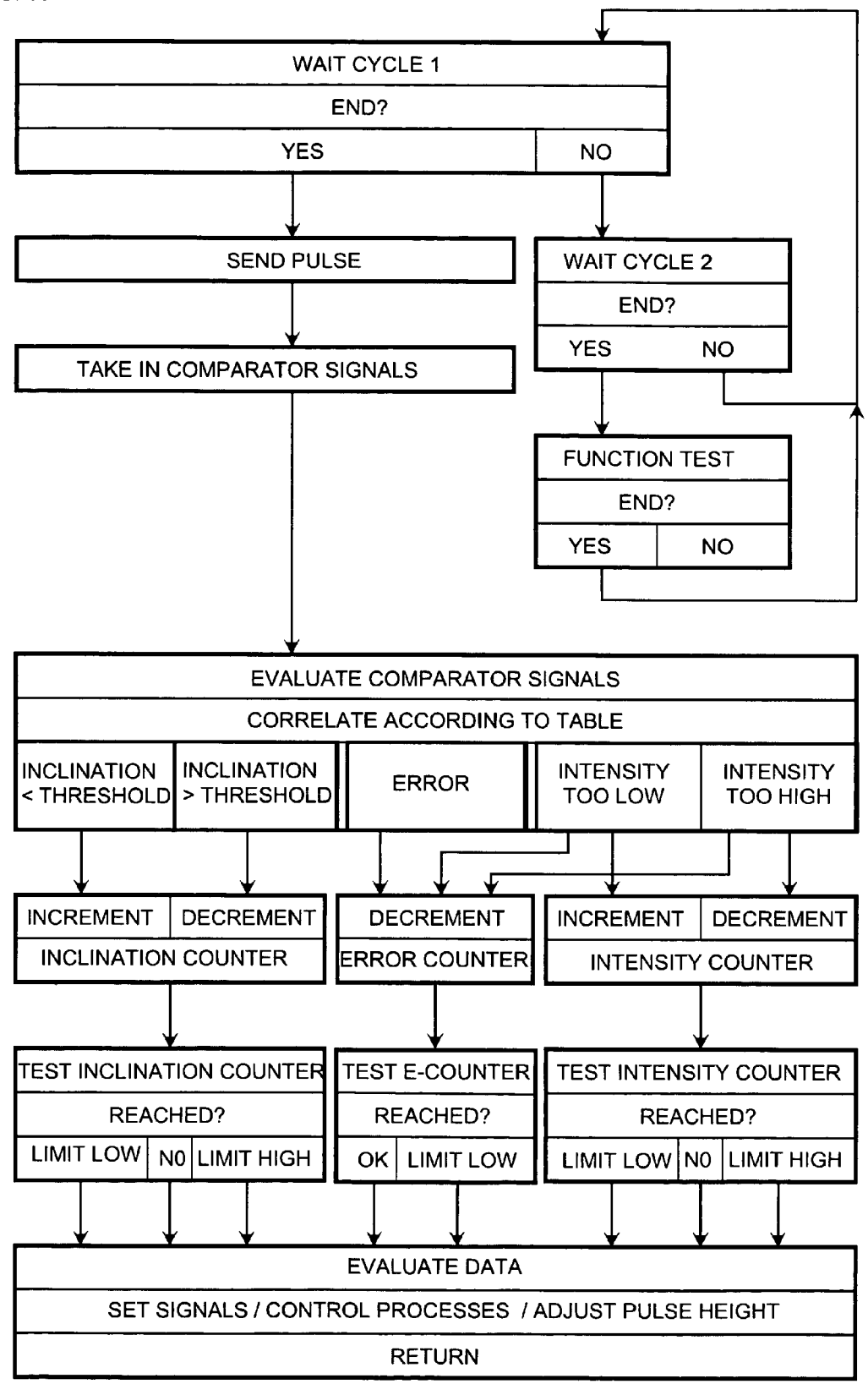
Figure 12:
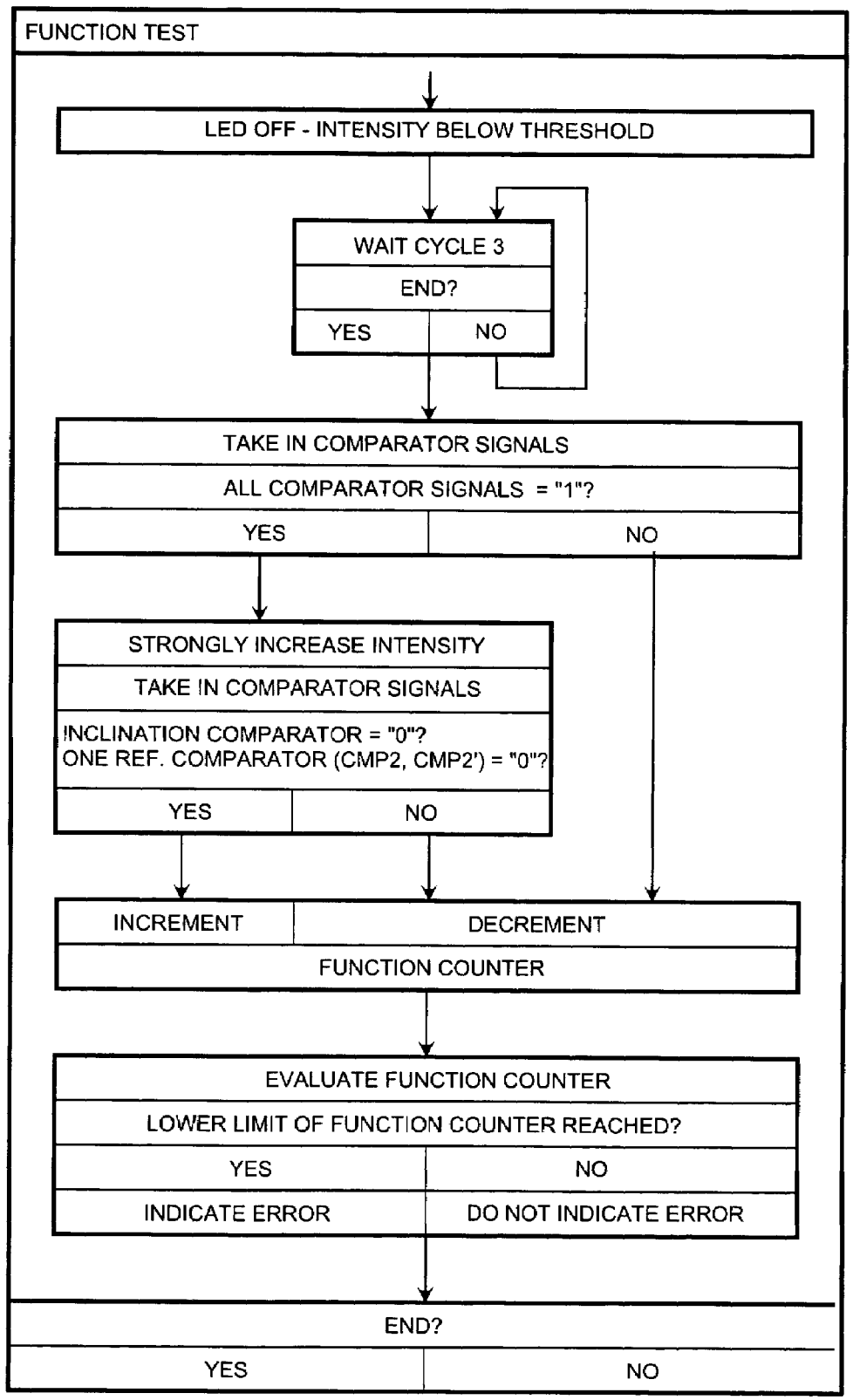
Figure 13:
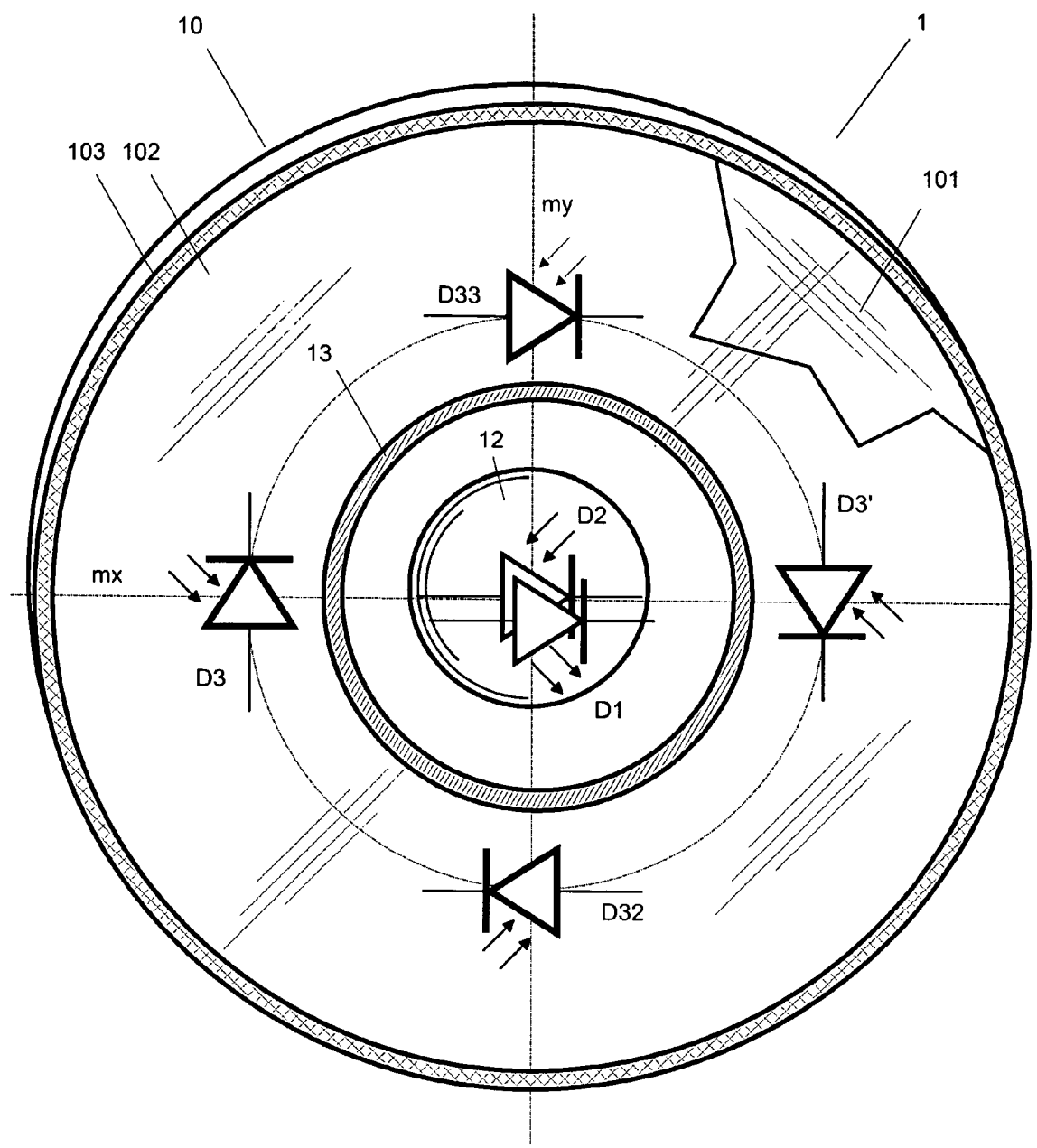

FIG. 10 represents the monitoring device according to the invention with a processor 4, which receives the output signals of the inclination sensor 1 by way of a comparator stage 3 that serves as an A/D converter, which is further connected by way of a D/A converter 2 to the radiation-emitting element D1 of the inclination sensor 1, and which is also connected to an input/output unit 5;

FIG. 11 represents a first flowchart diagram which illustrates the operating steps that occur in the processor 4;

FIG. 12 represents a second flowchart diagram which illustrates the operating steps in the sensor test that is shown in FIG. 11; and FIG. 13 represents an inclination sensor 1 of a second preferred configuration.

DETAILED DESCRIPTION

Figure 1:
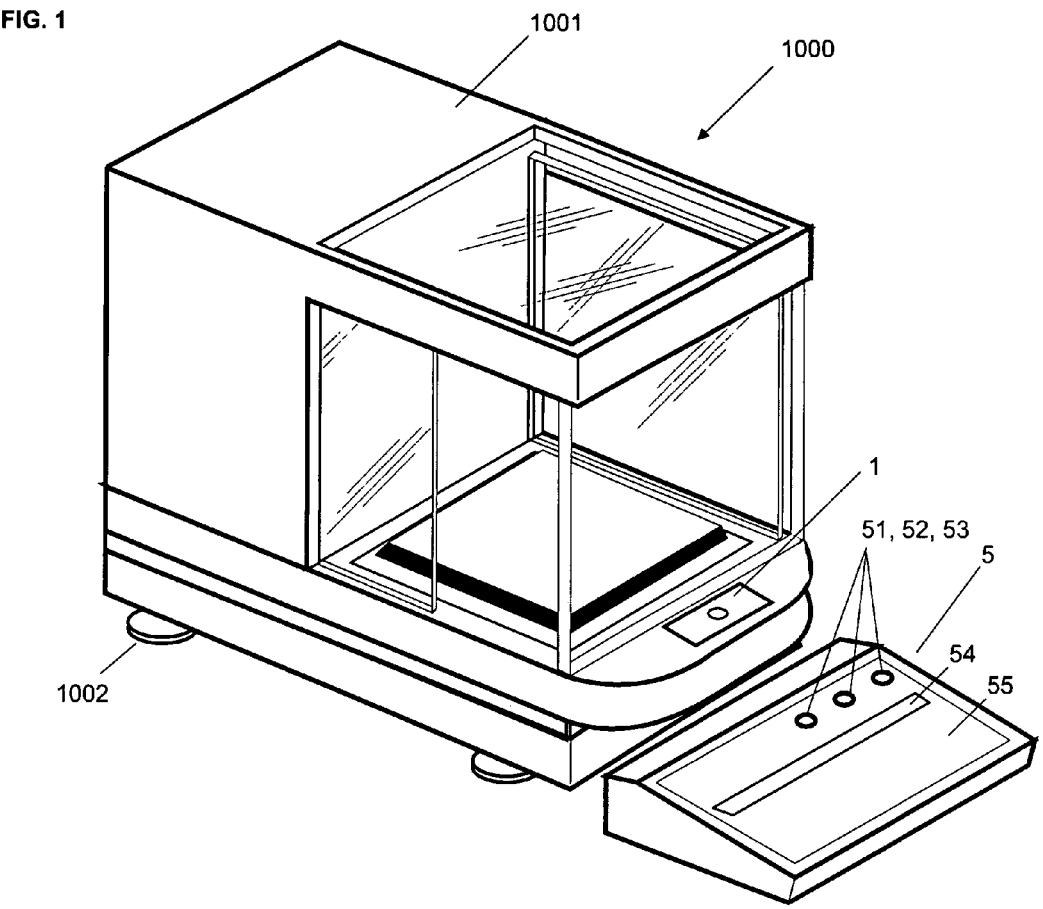

FIG. 1 illustrates a balance 1000 according to the invention with an inclination sensor 1 which is integrated in the balance housing 1001 in such a way that it is visible to the user. The inclination sensor 1, which operates according to the principle of a spirit level, is part of a monitoring device according to the invention. Thus, while the output signals of the inclination sensor 1 are processed in the monitoring device by means of a processor, the inclination can also be monitored through visual inspection by the user. Error messages of the monitoring device can therefore be verified easily through one glance at the spirit level or the inclination sensing device 1 and as a result of this arrangement, the operating convenience of the balance 1000 is enhanced. An out-of-tolerance inclination of the balance can be corrected by means of height-adjustable set-up feet 1002.

Figure 2:
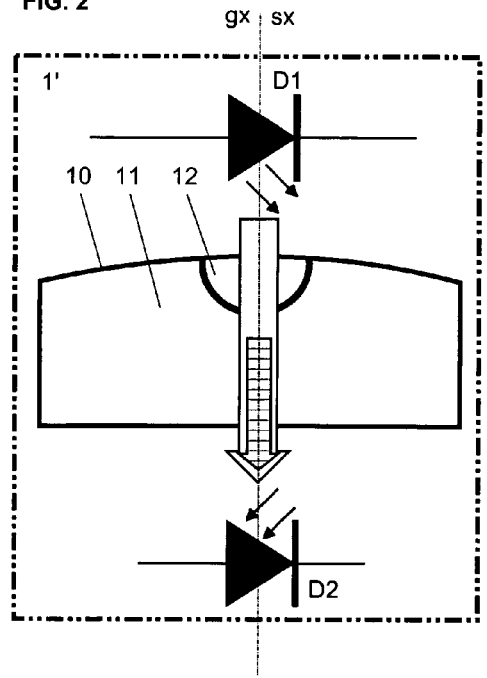
Figure 3:
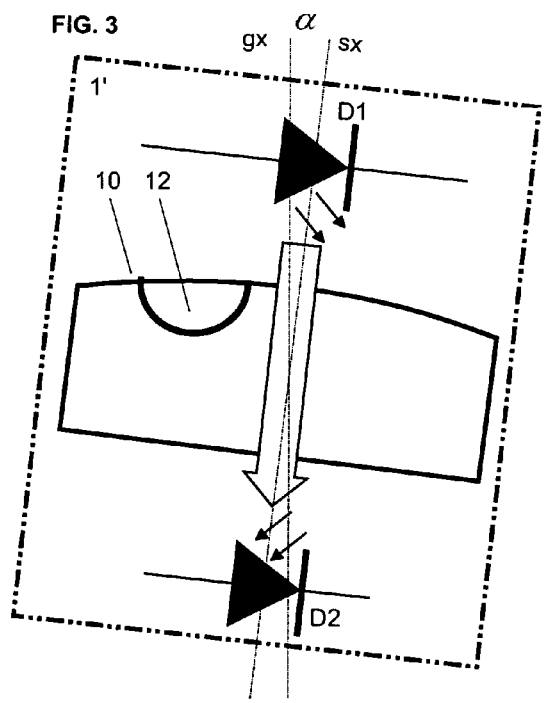
FIG. 3 represents the inclination sensor 1' of FIG. 2 in an inclined position tilted to the right.

FIG. 2 schematically illustrates an inclination sensor 1' whose sensor axis sx is aligned with the axis gx of the gravity force and which consists of a spirit level with a cylindrical container 10 that is partially filled with a liquid 11 so that a bubble 12 is formed. A radiation-emitting element D1 is arranged on top of the inclination sensor, and a sensor element D2 is arranged at the underside. The same inclination sensor 1' is shown in FIG. 3 tilted to the right at an angle α, so that the sensor axis sx is inclined by the angle α in relation to the gravity axis gx. The container 10 is closed off at both ends by transparent plates. The inside wall of the upper plate where the bubble is floating is slightly curved. In FIG. 2, the bubble 12 is located on the sensor axis sx which is defined by the positions of the radiation-emitting element D1 and the sensor element D2. In FIG. 3, the bubble 12 has moved to the left in response to the tilting of the container 10. In the situation illustrated in FIG. 2, the radiation emitted by the radiating element D1 therefore passes through the bubble and is attenuated by the effects of refraction and reflection. In contrast, in the situation shown in FIG. 3, the radiation is not attenuated by the bubble 12, so that the sensor element D2 produces a stronger output signal. Consequently, the output signal of the sensor element D2 can be presented to a comparator, for example the comparator CMP1 shown in FIG. 6, where the output signal is compared to a threshold value $u_{E11}$ which is selected so that the output signal of the sensor element D2 lies below the threshold value $u_{E11}$ if the radiation received by the sensor has been attenuated by the bubble, and above the threshold value $u_{E11}$ if the radiation received by the sensor has not been attenuated by the bubble. Thus, a logic level 1 of the output signal $u_{OUT1}$ of the comparator CMP1 indicates an angle position of the inclination sensor 1 corresponding to a leveled condition of the balance 1000 that is within the tolerance range, while a logic level 0 indicates an out-of-tolerance inclination.

Comparators of this type are described in reference [4], U. Tietze, Ch. Schenk, Halbleiterschaltungstechnik (Semiconductor Circuit Design), 11$^{th}$ edition, 2$^{nd}$ printing, published by Springer Verlag, Berlin 1999, pages 610-612.

However, if there is a change in the radiation intensity of the radiating element D1, for example due to a change in the energy supply, temperature-dependent properties of components, increased attenuation along the path of the radiation caused for example by color changes of the transparent plates, or due to changes of the characteristics of the sensor element D2, it is possible that the output signal of the sensor element D2 changes to such an extent that the inclination of the balance 1000 can no longer be monitored correctly on the basis of the given threshold value $u_{E11}$. To correct the situation, one could consider readjusting the threshold value $u_{E11}$, but this solution would involve considerable complexity and expense.

Figure 4:
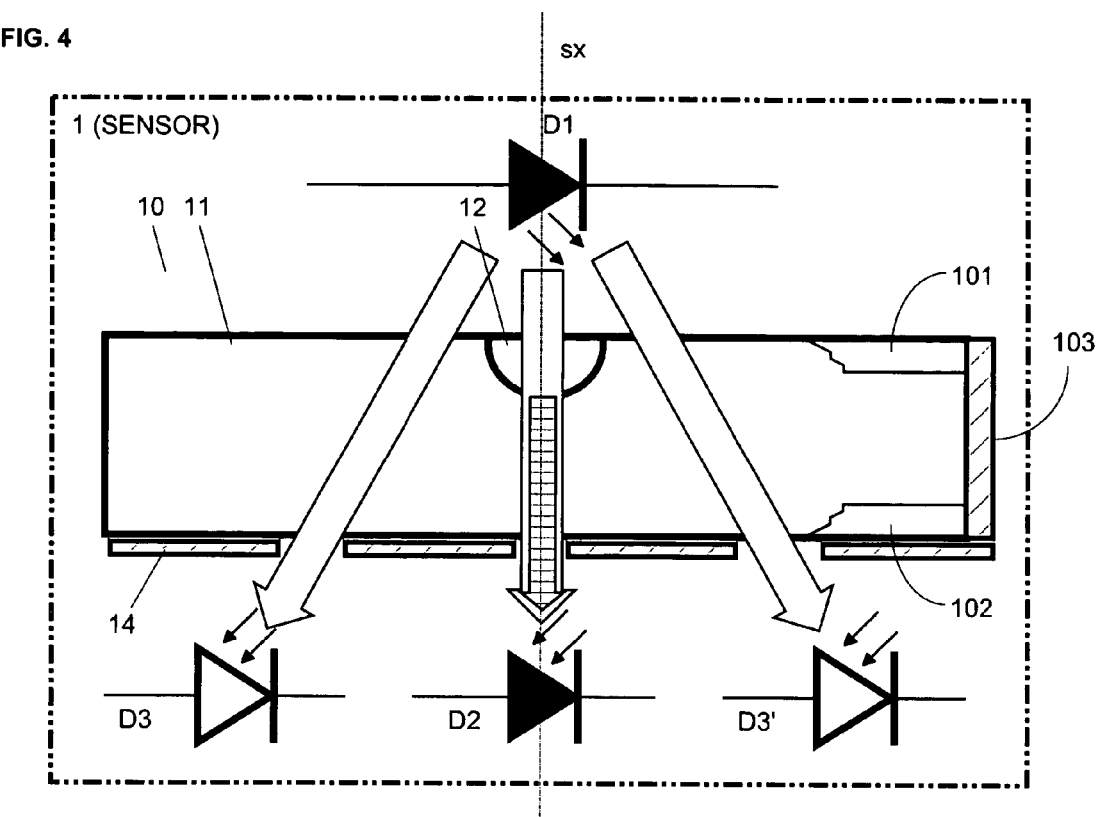
FIG. 4 represents an inclination sensor 1 in accordance with the invention consisting of a spirit level analogous to FIG. 2, with a radiation-emitting element D1 arranged above and a sensor element D2 as well as two reference elements D3, D3' arranged below the inclination sensor.

The invention therefore calls for the use of an inclination sensor 1 consisting of a spirit level in accordance with FIG. 4, which has a radiation-emitting element D1 arranged on top and a sensor element D2 as well as two reference elements D3, D3' arranged at the underside. As in the arrangement described in the preceding paragraph, the sensor axis sx is defined by the radiating element D1 and the sensor element D2. As long as the sensor axis sx is in approximate alignment with the axis gx of the gravity force, the bubble 12 lies on the sensor axis. The reference elements D3, D3' are arranged on either side of the sensor element D2, preferably at locations where the radiation received from the radiating element is not attenuated by the bubble 12 when the latter is centered on the sensor axis.

To show an example, FIG. 4 further illustrates parts of the container 10 which has an upper glass plate 101 and a lower glass plate 102 that are held in a cylindrical tube section 103 and enclose the liquid 11 in which a bubble 12 is formed. The lower glass plate 102 is further overlaid with a light barrier 14 with openings that allow radiation emitted by the radiating element D1 to fall on the sensor D2 and reference elements D3, D3' but block the passage of extraneous light coming from other directions. As another known possibility of reducing the effects of extraneous light, the radiating element D1 and/or the sensor element D2 and reference elements D3, D3' can be equipped with an optical filter of a narrow bandwidth.

Figure 5:
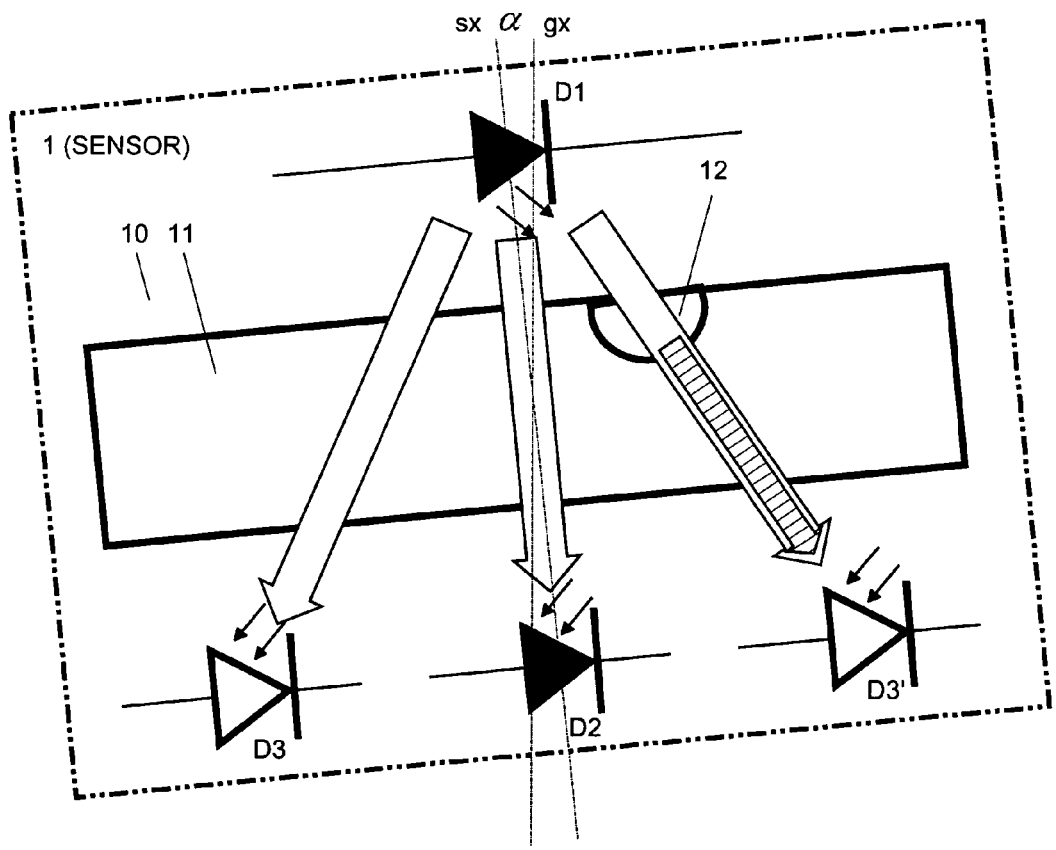
FIG. 5 represents the inclination sensor 1 of FIG. 4 in an inclined position tilted to the left.

FIG. 5 shows the inclination sensor 1 tilted to the left by the angle α, so that the bubble 12 moves to the right and the radiation from the radiating element D1 arrives at the sensor element substantially without being attenuated. The bubble now lies in the light path from the radiating element D1 to the second reference element D3'. The first reference element D3 still receives the non-attenuated level of radiation. The reverse conditions apply if the inclination sensor 1 is tilted to the right by the same angle α, in which case the second reference element D3' receives the radiation from the radiating element D1 substantially without attenuation.

Thus, the intensity of the radiation received can be monitored by means of the reference elements D3, D3'. By comparing the output signals of the reference elements D3, D3' to the two threshold values $u_{E21}$, $u_{E31}$ (shown as input voltages to the comparators CMP2, CMP3 in FIG. 6) it can be verified whether the intensity of the radiation is within a permissible range. If one of the output signals of the reference elements D3, D3' exceeds the higher threshold value $u_{E31}$, the radiation intensity is too high. If the output signals of both of the reference elements D3, D3' fall short of the lower threshold, then the radiation intensity is too low. Based on this evaluation of the radiation intensity, it is possible to make a correction if necessary.

Figure 6:
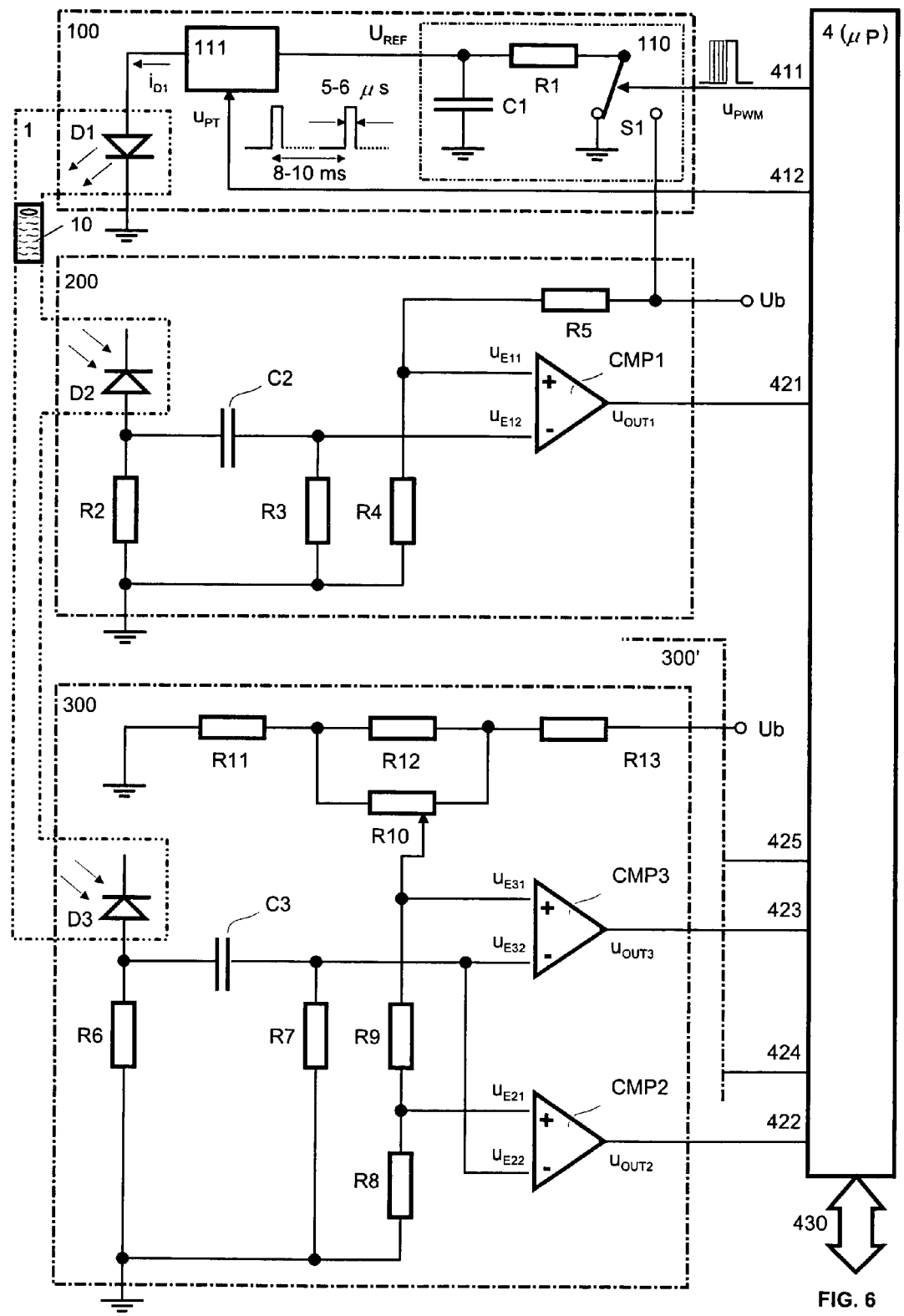
FIG. 6 represents a circuit arrangement connected to the inclination sensor 1 of FIG. 4.

As a means for correcting the radiation intensity, the sender module 100 in the circuit arrangement of FIG. 6 includes a controllable current source 111 which supplies the radiating element D1 with an operating current $i_{D1}$ in the form of pulses whose length and period interval depend on a control signal $u_{PT}$ and whose pulse height depends on a reference voltage $U_{REF}$. The reference voltage $U_{REF}$ is provided by a voltage source 110 which has a switch S1 that is controlled by means of a control signal $u_{PWM}$ which charges and discharges a capacitor C1 through a resistor R1 in accordance with the duty cycle ratio of the control signal $u_{PWM}$ which is delivered at the first output terminal of a processor 4. By changing the duty cycle ratio or, in other words, by modulating the pulse width of the control signal $u_{PWM}$, the capacitor C1 is charged to the required control voltage $U_{ST}$. At periodic or aperiodic intervals of preferably 5 to 15 milliseconds, the control signal $u_{PT}$ coming from a second output terminal 412 of the processor 4 switches the current source 111 on and off to release a pulse with a pulse width in the range of 5 to 15 microseconds. Particularly preferred are a period interval of about 10 milliseconds and a pulse duration of 8 to 10 microseconds. With coordinated, slightly delayed timing, the processor 4 interrogates the outputs of the comparators CMP1, CMP2 and CMP3 (as well as the comparators CMP2' and CMP3' for the second reference element D3' which are not shown in the drawing), which are connected to the processor 4 through respective inputs 421, 422, 423, 424 and 425. The comparator CMP1 receives the output signal of the sensor element D2, while the comparators CMP2, CMP3 receive the output signal of the reference element D3 and the comparators CMP2', CMP3' receive the output signal of the reference element D3'. The comparator modules 200, 300 and 300' (module 300' indicated only in a schematic manner) in FIG. 6, perform an analog/digital conversion of their respective input signals, while the sender module 100 performs a digital/analog conversion of the signal coming from output terminal 411 of the processor 4.

FIG. 6 also schematically illustrates the radiation-emitting element D1 which is tied into the circuit of the sender module 100, the sensor element D2 which is tied into the circuit of the first comparator module 200, and the reference element D3 which is tied into the circuit of the second comparator module 300.

The output signal of the sensor element D2 is transmitted through the R/C high-pass filter with the resistors R2, R3 and the capacitor C2 to the inverting input of the first comparator CMP1, whose non-inverting input is connected to a voltage divider formed of the resistors R4 and R5 which supplies the voltage $u_E$ representing a first threshold value. The output of the first comparator CMP1, which shows a logic 0 if the first threshold value has been exceeded, is connected to the input 421 of the processor 4.

The output signal of the sensor element D3 is transmitted through the R/C high-pass filter with the resistors R6, R7 and the capacitor C3 to the inverting inputs of the second comparator CMP2 and third comparator CMP3 which together form a window comparator (see [4], pages 611-612). The non-inverting inputs of the comparators CMP2 and CMP3 are connected to a variable voltage divider formed of the resistors R8, R9, R11, R12, R14 and the variably controllable resistor R10. The variable voltage divider is configured in such a way that the non-inverting input of the second comparator CMP2 receives the voltage $u_{E21}$ representing a second, lower threshold value, while the non-inverting input of the third comparator CMP3 receives the voltage $u_{E31}$ representing a third, upper threshold value.

The outputs of the second comparator CMP2 and of the third comparator CMP3, which indicate whether the second or possibly also the third threshold value has been exceeded, are connected to the respective inputs 422 and 423 of the processor 4.

A condition where the third, upper threshold value has been exceeded implies that the lower, second threshold value has also been exceeded, so that the output signal $u_{OUT2}$ of the second comparator should in this case likewise indicate a logic 0. If this is not the case, the evaluation of the input signals received by the processor 4 is preferably programmed to conclude the presence of an error (see Table "Evaluation of Comparator Output Signals" below).

Figure 7:
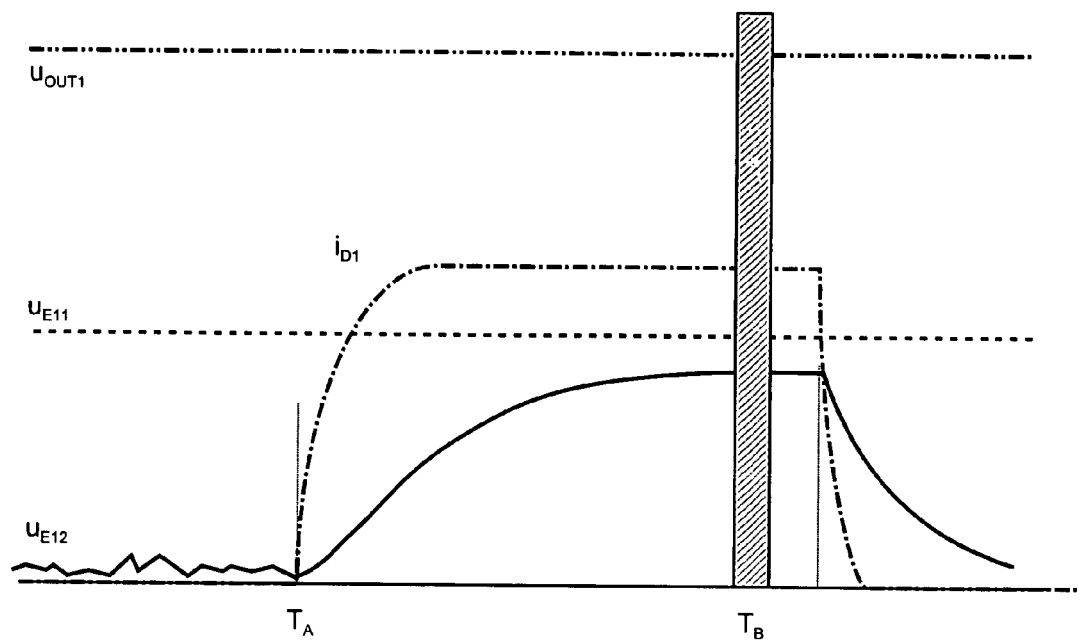
FIG. 7 represents the time profile of the input signals $u_{E11}$, $u_{E12}$ of a first comparator CMP1 assigned to the sensor element D2 in the circuit arrangement of FIG. 6 when the inclination sensor 1 is in the leveled position shown in FIG. 4.

FIG. 7 illustrates the time profile of the current $i_{D1}$ in the radiation-emitting element D1 during the emission of a radiation pulse as well as the corresponding time profiles of the input signals $u_{E11}$, $u_{E12}$ received by the first comparator CMP1, if the inclination sensor 1 is in the leveled condition shown in FIG. 4. After the steep rise of the current $i_{D1}$ at the time $T_A$, the voltage $u_{E12}$ increases but does not rise above the voltage $u_{E11}$ representing the first threshold value, so that the output signal $u_{OUT1}$ of the comparator CMP1 remains unchanged. Thus, at the time $T_B$ the output of the first comparator CMP1 is found to be at the logic level 1.

Figure 8:
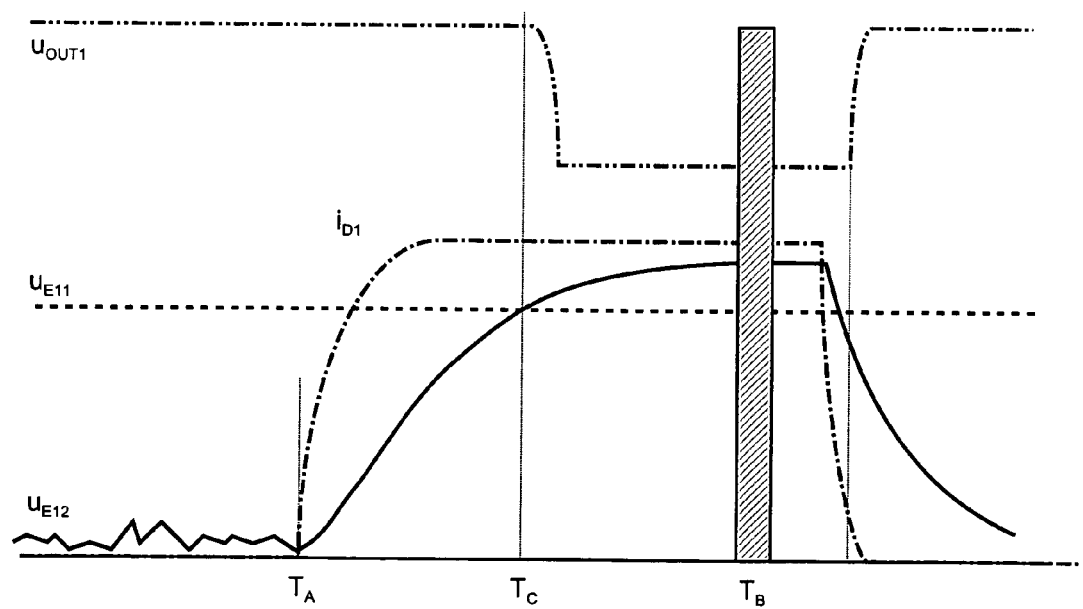
FIG. 8 represents the time profile of the input signals $u_{E11}$, $u_{E12}$ of the first comparator CMP1 when the inclination sensor 1 is in the position shown in FIG. 5.

FIG. 8 illustrates the time profile of the current $i_{D1}$ in the radiation-emitting element D1 during the emission of a radiation pulse as well as the corresponding time profiles of the input signals $u_{E11}$, $u_{E12}$ received by the first comparator CMP1, if the inclination sensor 1 is in the out-of-level condition shown in FIG. 5. In this case, the voltage $u_{E12}$ at the inverting input of the first comparator CMP1 at the time $T_C$ rises above the voltage $u_{E11}$ representing the first threshold value, so that at the time $T_B$ the output of the first comparator CMP1 is found to be at the logic level 0.

Figure 9:
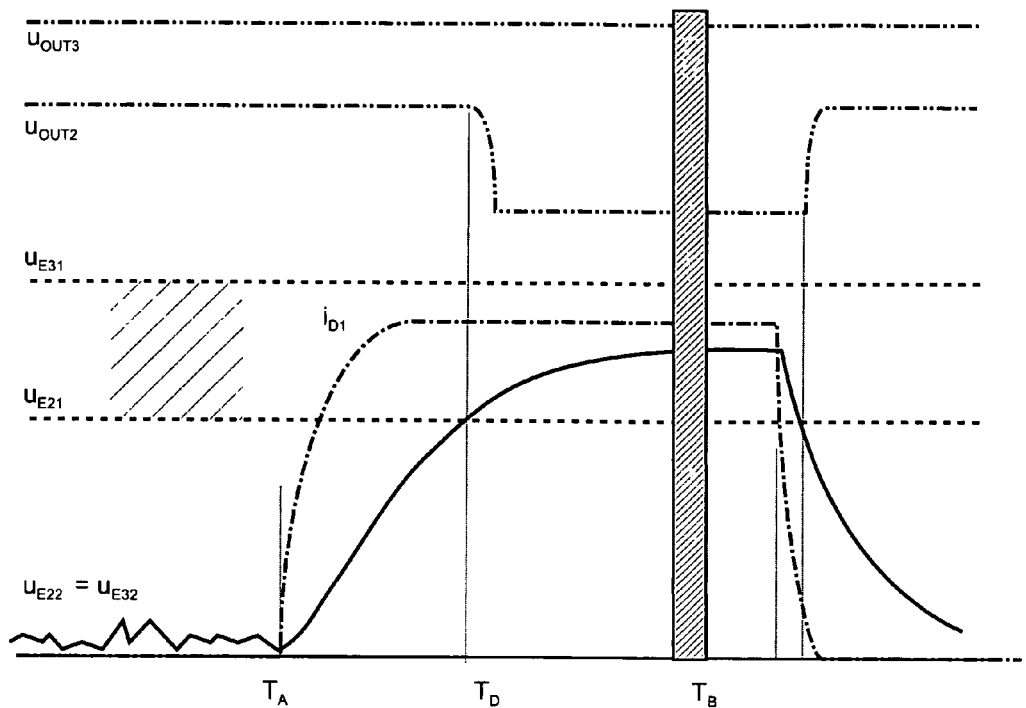
FIG. 9 represents a typical time profile of the respective input signals $u_{E21}$, $u_{E22}$ and $u_{E31}$, $u_{E32}$ of a second comparator CMP2 and a third comparator CMP3 that are assigned, respectively, to reference elements D3 and D3'.

FIG. 9 represents a typical time profile of the respective input signals $u_{E21}$, $u_{E22}$ and $u_{E31}$, $u_{E32}$ at the second comparator CMP2 and third comparator CMP3. A situation is illustrated where the voltage $u_{E22}$ or $u_{E32}$ ($u_{E22}=u_{E32}$) at the inverting inputs of the comparators CMP2 and CMP3 at the time $T_D$ rises above the voltage $u_{E21}$ representing the second, lower threshold value, so that at the time $T_B$ the output of the second comparator CMP2 is found to be at the logic level 0. However, the voltage level $u_{E31}$ representing the third, upper threshold value is not exceeded, so that at the time $T_B$ the output of the third comparator CMP3 is found to be at the logic level 1 which indicates that the radiation intensity is within the prescribed range.

FIG. 10 represents a block diagram of the monitoring device 150 according to the invention with the inclination sensor 1, a comparator group 3 containing the comparator modules 200; 300, 300', . . . , a D/A converter 2 serving for the control of the radiation-emitting element D1, and an input/output unit 5 connected to the processor 4 (man/machine interface MMI). The input/output unit 5 includes an arrangement of annunciator elements 51, 52, 53, for example light-emitting diodes, an indicator unit 54, for example a liquid crystal display, and an input unit 55, for example a keyboard or a touch-sensitive display unit. The processor 4, which is equipped with an operating program 43 stored in a memory unit 41, can be constituted for example by the main processor of the balance 1000 or by a separate processor in which an applications program 42 is implemented that serves to evaluate the comparator signals $u_{OUT1}$, $u_{OUT2}$ and $u_{OUT3}$, and which further serves to control the radiation-emitting element D1, to signal the condition of the balance 1000, and if applicable to control measuring and production processes that are dependent on the condition of the balance.

FIG. 11 shows a first flowchart diagram with the operating steps that need to be executed under the applications program 42. Following a first wait cycle, a pulse is sent out at the time $T_A$, whereupon at the time $T_B$ the digital values of the comparator signals $u_{OUT1}$, $u_{OUT2}$ and $u_{OUT3}$ are taken in (as well as the comparator signals $u_{OUT2}$ and $u_{OUT3}$ of the second comparator module 300' which is connected to the second reference element D3', analogous to the first comparator module 300 and therefore not detailed in the drawing). Subsequently, a status value which corresponds to the combination of detected comparator signals $u_{OUT1}$, $u_{OUT2}$, $u_{OUT3}$, $u_{OUT2}$, and $u_{OUT3}$ and describes the status of the balance 1000 and the monitoring device 150 is looked up from a table.

Following is an excerpt of this table with some typical combinations of the comparator signals $u_{OUT1}$, $u_{OUT2}$, $u_{OUT3}$, $u_{OUT2}$ and $u_{OUT3}$. A logic value of 0 means in each case that the threshold monitored by the respective comparator CMP1, . . . , has been exceeded.

TABLE

Evaluation of Comparator Output Signals

| Case # | Comparator Module 200 CMP1 $u_{OUT1}$ | Comparator Module 300 CMP2 $u_{OUT2}$ | Comparator Module 300 CMP3 $u_{OUT3}$ | Comparator Module 300' CMP2' $u_{OUT2'}$ | Comparator Module 300' CMP3' $u_{OUT3'}$ | Status |
|---|---|---|---|---|---|---|
| 1 | 0 | 0 | 0 | 0 | 0 | Intensity too high |
| 2 | 0 | 0 | 1 | 0 | 0 | Intensity too high |
| 3 | 1 | 1 | 1 | 1 | 1 | Intensity too low |
| 4 | 0 | 1 | 0 | 0 | 1 | Error |
| 5 | 0 | 0 | 1 | 1 | 0 | Error |
| 6 | 0 | 0 | 1 | 1 | 1 | Out-of-level condition |
| 7 | 1 | 0 | 1 | 0 | 1 | Level within tolerance |
| . . . 32 | . . . | . . . | . . . | . . . | . . . | . . . |

In the cases 1 and 2 of the table, the upper threshold value in one of the window comparators, i.e., the reference value of one or both of the comparators CMP3 and CMP3' is exceeded, and as a result the radiation intensity is registered as being too high.

In case 3, none of the threshold values is exceeded and accordingly the radiation intensity is registered as being too low.

In the cases 4 and 5, one of the third, upper threshold values is found to be exceeded without a simultaneous finding that the traversing of the lower, second threshold value has triggered the respective comparator CMP2 or CMP2'. This indicates a malfunction in the comparator modules 200, 300, 300'.

In case 6, the first comparator CMP1 has switched to 0 while one of the window comparators, in this case the comparator combination CMP2/CMP3, indicates that the radiation intensity lies within the prescribed range. This indicates an out-of-level condition.

In case 7, the first comparator CMP1 has not switched to 0 because the bubble 12 has remained in a centered position relative to the sensor axis sx. This indicates a correctly leveled condition.

To prevent false alarms after a single incidence of detecting a functional error, an out-of-level error or an out-of-tolerance intensity, the evaluation results are tallied by incrementing and decrementing individual counters, i.e., an inclination counter, an error counter, and an intensity counter. If the intensity is found to be too high or too low, the intensity counter is incremented or decremented and the error counter is decremented. Signals are turned on only when a limit value is reached in one of the counts, for example by switching the light-emitting diodes 51, 52, 53 which indicate, respectively, the conditions of INCLINATION IN TOLERANCE—INCLINATION OUT OF TOLERANCE—SYSTEM ERROR. If a limit value has been reached which indicates that the radiation intensity is outside the prescribed range, this condition is corrected by adjusting the supply of electrical power to the radiating element D1, i.e., the diode current $i_{D1}$.

If the first wait cycle has not yet ended, the program loops through a test to determine whether a second wait cycle has ended. If this is the case, the function test is performed which is shown in a separate diagram in FIG. 12 and which serves to verify whether the modules and components are functioning correctly.

In performing the function test, a first step consists of setting the radiation intensity to zero ($i_{D1}=0$) or raising it only into a range where the comparators CMP1, ..., are not yet allowed to switch their logic outputs. Consequently, if a comparator CMP1, ..., switches its output in this test, this is noted as an error which causes a function counter to be decremented. In a second step, the radiation intensity is raised into a range in which at least the first comparator CMP1 (inclination comparator) and the comparators CMP2, CMP3 or CMP2', CMP3' of one of the window comparators should switch from logic 1 to logic 0. If the comparators CMP2, CMP3 or CMP2', CMP3' fail to switch, an error is registered and the function counter is decremented. If no switching failure is found, the function counter is incremented. Subsequently, the content of the function counter is evaluated, and a function error is signaled if the respective limit value has been reached.

The method according to the invention, the monitoring device 150 and the balance 1000 have been described in preferred embodiments. However, based on the concepts taught by the invention it is possible to realize further embodiments. In particular the inventive inclination sensor 1 can also be used with differently configured comparator circuits and evaluation programs. The evaluation of the comparator signals with the applications software 42 as described herein is particularly advantageous. However, by using the inventive concepts as a basis, individuals of ordinary skill in the art will be able to adapt this applications program to given requirements.

To satisfy other design requirements, the inclination sensor or more specifically the spirit level can be realized in further configurations. FIG. 13 illustrates a top view of an inclination sensor according to the invention, but slightly inclined towards the lower right. The bubble 12 still lies in the light path between the radiation-emitting element D1 and the sensor element D2 but has moved towards a control circle 13 which allows a visual determination whether the inclination is still within the permissible range, and which provides a visual reference for the magnitude of the inclination inside or outside the permissible range and for the direction of the inclination gradient. As mentioned above, there are special advantages in using a visual surveillance by the user to supplement the electronic monitoring, but the magnitude and gradient direction of the inclination can also be determined electronically by using at least one or two further reference elements D32, D33. As a preferred arrangement, the reference elements D3 and D3' are arranged on a first measurement axis mx and the two further reference elements D32, D33 are arranged on a second measurement axis my which runs perpendicular to the first measurement axis mx. As long as the bubble 12 moves along the second measurement axis my, the monitoring device registers a condition according to case #7 in the foregoing evaluation table of comparator output signals, but a point may be reached where the first comparator CMP1 switches from logic 1 to logic 0. The direction in which the bubble 12 has migrated along the second measurement axis my can now be determined from the further reference elements D32, D33 and their associated comparators. For example, if the comparator that is connected to the reference element D32 switches its logic level, the bubble 12 has migrated to a position between the radiating element D1 and the reference element D32.

The inclination sensor 1 and the monitoring device 150 can be used to particular advantage in a balance 1000. However, as is self-evident, the inclination sensor 1 and the monitoring device 150 can also be used in any other kind of measuring apparatus.

LIST OF LITERATURE REFERENCES

[1] Published patent application DE 32 34 372 A1
[2] Published patent application JP 61 108927 A2
[3] Published patent application DE 38 00 155 A1
[4] U. Tietze, Ch. Schenk, Halbleiterschaltungstechnik, 11$^{th}$ Edition, 2$^{nd}$ Printing, Springer Verlag, Berlin 1999

LIST OF REFERENCE SYMBOLS

| | |
|---|---|
| 1 | inclination sensor |
| 10 | container |
| 11 | liquid |
| 12 | bubble |
| 13 | control circle |
| 14 | light barrier |
| 100 | sender module |
| 101 | upper glass plate |
| 102 | lower glass plate |
| 103 | cylindrical tube section |
| 110 | voltage source |
| 111 | current source |
| 150 | monitoring device |
| 1000 | balance |
| 1001 | balance housing |
| 1002 | adjustable feet |
| 1003 | entry unit |
| 2 | digital/analog converter |
| 200 | first comparator module |
| 3 | analog/digital converter-comparator group |
| 300, 300' | second comparator module |
| 4 | processor |
| 41 | memory unit |
| 411, 412 | output terminals |
| 42 | software application program |
| 421-425 | input terminals |
| 430 | bus/system bus |
| 43 | operating system |
| 5 | input/output unit |
| 51, 52, 53 | light-emitting diodes |
| 54 | indicating unit, liquid crystal display |
| 55 | keyboard, touch-sensitive display screen |
| C1, C2 | capacitors |
| CMP1, | comparators, operational amplifiers |
| D1 | radiating element (light-emitting diode) |

-continued

| | |
|---|---|
| D2 | sensor element (photodiode) |
| D3, D3' | reference elements (photodiodes) |
| R1, R13 | resistors |
| S1 | switch |
| T1 | switching transistor |

We claim:

1. A method for monitoring the alignment of a measuring instrument, comprising the steps of:
providing a monitoring device for the measuring instrument, the monitoring device having an inclination sensor comprising a container filled with a fluid in which a visibly monitorable bubble is formed, a radiating element arranged on a first side of the bubble for emitting a radiation, a sensor element and a pair of reference elements arranged on a second side of the bubble for receiving the radiation, wherein the inclination sensor functions according to the principle of a spirit level and the radiating element and the sensor element define a sensor axis that passes through the bubble when the bubble is centered, the sensor element being flanked by the respective reference elements;
measuring optically the position of the bubble by the steps of emitting a radiation and receiving the radiation at the sensor element and the reference elements;
testing whether the intensity of the radiation is within a permissible range using the reference elements; and
verifying that the monitoring device is functioning correctly by performing a function test automatically inside the monitoring device.

2. The method of claim 1, wherein the optical measuring step occurs under at least one of the following conditions:
the radiating element emits radiation in the infrared range;
the sensor element and the reference elements aligned in a straight line therewith are adapted to selectively receive radiation in the infrared range; and
the reference elements are arranged such that the radiation received does not cross the bubble when the bubble is centered on the sensor axis.

3. The method of claim 2, further comprising the steps of:
measuring an inclination of the measuring instrument with a first comparator that compares an output signal of the sensor element to a first threshold value that represents whether the distance of the bubble from the sensor axis is within a range corresponding to a permissible inclination; and
determining an amount of electrical power to be supplied to the radiating element, using a second comparator that compares an output signal of each of the reference elements to a second threshold value and a third comparator that compares an output signal of each of the reference elements to a third threshold value, wherein the second and third threshold values define lower and upper limits, respectively, of a permissible range of radiation intensity from the radiating element.

4. The method of claim 3, comprising the further step of:
controlling the monitoring device by performing each of the following actions as needed:
increasing the intensity of the radiation by means of a test sequence to a level designed to generate output signals of the sensor element and reference elements that lie below the second threshold value, evaluating the output signals of the comparators associated with the first, second and third threshold values and registering an error if the output signals indicate that a threshold value has been exceeded;
increasing the intensity of the radiation by means of the test sequence to a level designed to generate output signals of the sensor element and reference elements that lie above the first and third threshold values, evaluating the output signals of the comparators associated with the first, second and third threshold values, and registering an error if the output signals indicate that a threshold value has not been attained;
registering an error during the inclination measurement if the output signal of the comparator associated with the second threshold value indicates that the second threshold value has not been attained and if the output signal of the comparator associated with the third threshold value indicates that the third threshold value has been exceeded;
registering an excessive intensity of the radiation during the inclination measurement if the output signal of the comparator associated with the third threshold value indicates that the third threshold value has been exceeded; and
registering an insufficient intensity of the radiation during the inclination measurement if the output signals of all comparators indicate that their respective threshold values have not been attained.

5. The method of claim 1, further comprising the steps of:
measuring the inclination of the measuring instrument with a first comparator that compares an output signal of the sensor element to a first threshold value that represents whether the distance of the bubble from the sensor axis is within a range corresponding to a permissible inclination; and
determining an amount of electrical power to be supplied to the radiating element, using a second comparator that compares an output signal of each of the reference elements to a second threshold value and a third comparator that compares an output signal of each of the reference elements to a third threshold value, wherein the second and third threshold values define lower and upper limits, respectively, of a permissible range of radiation intensity from the radiating element.

6. The method of claim 5, wherein the radiation is emitted periodically or aperiodically in pulses that follow each other in intervals of 5 to 15 milliseconds and that have pulse widths from 5 to 15 microseconds.

7. The method of claim 6, wherein the electrical power supplied to the radiating element is determined by a change in the pulse height.

8. The method of claim 6, further comprising the step of:
processing the output signals of all of the comparators in a processor, by performing each of the following actions as needed:
each time the first threshold value is not attained or is exceeded, an inclination counter is changed, respectively, towards a first or second limit value;
each time the second threshold value is not attained, an intensity counter is changed in the direction from a third towards a fourth limit value;
each time the third threshold value is exceeded, the intensity counter is changed in the direction from the fourth towards the third limit value;
after an error has been registered during the test sequence, a function counter is changed in the direction towards a fifth limit value; and
after an error has been registered during the inclination measurement, the function counter is changed in the direction towards the fifth limit value or an error counter is changed in the direction towards a sixth limit value.

9. The method of claim 8, further comprising:
responding as needed to the respective limit values by:
signaling an inclination inside or outside of the tolerance range after the first or second limit value has been reached, and stopping the measuring process if necessary;
adjusting the electrical power supplied to the radiating element after the third or fourth limit value has been reached; and
signaling an error after the fifth or sixth limit value has been reached, and stopping the measuring process.

10. The method of claim 5, comprising the further step of:
controlling the monitoring device by performing each of the following actions as needed:
increasing the intensity of the radiation by means of a test sequence to a level designed to generate output signals of the sensor element and reference elements that lie below the lower threshold value, evaluating the output signals of the comparators associated with the first, second and third threshold values and registering an error if the output signals indicate that a threshold value has been exceeded;
increasing the intensity of the radiation by means of the test sequence to a level designed to generate output signals of the sensor element and reference elements that lie above the first and third threshold values, evaluating the output signals of the comparators associated with the first, second and third threshold values, and registering an error if the output signals indicate that a threshold value has not been attained;
registering an error during the inclination measurement if the output signal of the comparator associated with the second threshold value indicates that the second threshold value has not been attained and if the output signal of the comparator associated with the third threshold value indicates that the third threshold value has been exceeded;
registering an excessive intensity of the radiation during the inclination measurement if the output signal of the comparator associated with the third threshold value indicates that the third threshold value has been exceeded; and
registering an insufficient intensity of the radiation during the inclination measurement if the output signals of all comparators indicate that their respective threshold values have not been attained.

11. The method of claim 10, further comprising the step of:
processing the output signals of all of the comparators in a processor, by performing each of the following actions as needed:
each time the first threshold value is not attained or is exceeded, an inclination counter is changed, respectively, towards a first or second limit value;
each time the second threshold value is not attained, an intensity counter is changed in the direction from a third towards a fourth limit value;
each time the third threshold value is exceeded, the intensity counter is changed in the direction from the fourth towards the third limit value;
after an error has been registered during the test sequence, a function counter is changed in the direction towards a fifth limit value; and
after an error has been registered during the inclination measurement, the function counter is changed in the direction towards the fifth limit value or an error counter is changed in the direction towards a sixth limit value.

12. The method of claim 11, further comprising:
responding as needed to the respective limit values by:
signaling an inclination inside or outside of the tolerance range after the first or second limit value has been reached, and stopping the measuring process if necessary;
adjusting the electrical power supplied to the radiating element after the third or fourth limit value has been reached; and
signaling an error after the fifth or sixth limit value has been reached, and stopping the measuring process.

13. A device for monitoring an alignment of a measuring instrument, comprising:
an inclination sensor functioning according to the principle of a spirit level, said inclination sensor having a container filled with a fluid in which a visibly-monitorable bubble is formed;
a radiating element arranged on a first side of the bubble to emit a radiation;
a sensor element arranged on a second side of the bubble to receive the radiation, the radiating element and the sensor element defining a sensor axis for optically measuring the position of the bubble; and
at least two reference elements flanking the sensor element on the second side of the bubble in respectively opposite positions therefrom, the at least two reference elements adapted to test whether the intensity of the radiation is within a permissible range, and
a means for automatically performing a function test to verify proper functioning of the monitoring device.

14. The monitoring device of claim 13, wherein:
the radiating element is adapted to emit radiation in the infrared range;
the sensor element and the at least two reference elements are adapted to selectively receive radiation in the infrared range; and
the at least two reference elements are arranged such that each reference axis, defined by the radiating element and one of the reference elements, does not pass through the bubble when the bubble is substantially centered on the sensor axis.

15. The monitoring device of claim 14, wherein:
a first comparator compares an output signal of the sensor element to a first threshold value that represents a measure for determining whether the distance of the bubble from the sensor axis is within a range corresponding to a permissible inclination;
a second comparator compares an output signal of a first of the at least two reference elements to both a second threshold value and a third threshold value, wherein the second and third threshold values, respectively, define a lower and an upper value for a range of permissible radiation intensity; and
a third comparator compares an output signal of a second of the at least two reference elements to both the second and the third threshold values.

16. The monitoring device of claim 15, wherein:
the radiating element is a light emitting diode.

17. The monitoring device of claim 13, wherein:
a first comparator compares an output signal of the sensor element to a first threshold value that represents a measure for determining whether the distance of the bubble from the sensor axis is within a range corresponding to a permissible inclination;

a second comparator compares an output signal of a first of the at least two reference elements to both a second threshold value and a third threshold value, wherein the second and third threshold values, respectively, define a lower and an upper value for a range of permissible radiation intensity; and a third comparator compares an output signal of a second of the at least two reference elements to both the second and the third threshold values.

18. The monitoring device of claim 17, wherein:
the radiating element is a light emitting diode.

19. The monitoring device of claim 18, wherein:
a processor receives the output signals of all of the comparators, and:

changes an inclination counter towards a first or second limit value each time the first threshold value is, respectively, not attained or exceeded;

changes an intensity counter in the direction from a third towards a fourth limit value each time the second threshold value is not attained;

changes the intensity counter in the direction from the fourth towards the third limit value each time the third threshold value is exceeded;

changes a function counter in the direction towards a fifth limit value after an error has been registered during the test sequence; and changes the function counter in the direction towards the fifth limit value or changes an error counter in the direction towards a sixth limit value after an error has been registered during the bubble position measurement.

20. The monitoring device of claim 19, wherein:
at least one of an annuniciator element and an indicator unit signal that an inclination inside or outside the tolerance range after the first or second limit value has been reached and the measurement process is stopped if necessary;

the intensity of the radiation is changed accordingly after the third or fourth limit value has been reached, by changing the power supplied to the radiating element; and at least one of the annunciator element and the indicator unit signal an error corresponding to the fifth or sixth limit value after the respective fifth or sixth limit value is reached and the measurement process is stopped if necessary.

21. The monitoring device of claim 17, wherein:
a processor receives the output signals of all of the comparators and:

changes an inclination counter towards a first or second limit value each time the first threshold value is, respectively, not attained or exceeded;

changes an intensity counter in the direction from a third towards a fourth limit value each time the second threshold value is not attained;

changes the intensity counter in the direction from the fourth towards the third limit value each time the third threshold value is exceeded;

changes a function counter in the direction towards a fifth limit value after an error has been registered during the test sequence; and changes the function counter in the direction towards the fifth limit value or changes an error counter in the direction towards a sixth limit value after an error has been registered during the bubble position measurement.

22. The monitoring device of claim 21, wherein:
at least one of an annunciator element and an indicator unit signal that an inclination inside or outside the tolerance range after the first or second limit value has been reached and the measurement process is stopped if necessary;

the intensity of the radiation is changed accordingly after the third or fourth limit value has been reached, by changing the power supplied to the radiating element; and at least one of the annunciator element and the indicator unit signal an error corresponding to the fifth or sixth limit value after the respective fifth or sixth limit value is reached and the measurement process is stopped if necessary.

23. The monitoring device of claim 13, further comprising:
means for visually checking the position of the bubble in the inclination sensor.

24. A measuring instrument, comprising:
a monitoring device comprising:

an inclination sensor functioning according to the principle of a spirit level, said inclination sensor having a container filled with a fluid in which a visibly-monitorable bubble is formed;

a radiating element arranged on a first side of the bubble to emit a radiation;

a sensor element arranged on a second side of the bubble to receive the radiation;

the radiating element and the sensor element together defining a sensor axis for optically measuring the position of the bubble; and at least two reference elements flanking the sensor element on the second side of the bubble in respectively opposite positions therefrom, the at least two reference elements adapted to test whether the intensity of the radiation is within a permissible range, and a means for automatically performing a function test to verify proper functioning of the monitoring device.

25. The measuring instrument of claim 24, wherein:
the measuring instrument is a balance.

26. The measuring instrument of claim 24, wherein:
the inclination sensor is mounted on the a housing of the measuring instrument such that a deviation of the bubble from the sensor axis is visible.

* * * * *